United States Patent [19]

Smith

[11] Patent Number: 4,800,827
[45] Date of Patent: Jan. 31, 1989

[54] APPARATUS AND IMPROVED METHOD FOR DISPENSING MATTER INTO THE GROUND

[76] Inventor: Wayne H. Smith, R.R. 2, Leoti, Kans. 67861

[21] Appl. No.: 23,537

[22] Filed: Mar. 9, 1987

Related U.S. Application Data

[63] Continuation-in-part of Ser. No. 861,840, May 12, 1986, Pat. No. 4,760,805.

[51] Int. Cl.⁴ .................... A01C 23/02; A01C 15/02
[52] U.S. Cl. ........................................ 111/7.2; 111/97
[58] Field of Search ............ 111/89, 90, 92, 95, 111/97, 7.1–7.4; 47/57.5; 222/361, 362

[56] References Cited

U.S. PATENT DOCUMENTS

2,805,799  9/1957  Hileman .............................. 222/362
3,014,443  12/1961  Keyser ................................ 111/7.2

Primary Examiner—Robert A. Hafer
Assistant Examiner—Danton D. DeMille
Attorney, Agent, or Firm—John Wade Carpenter

[57] ABSTRACT

An improved apparatus for dispensing matter into the ground having a rod, and a body conduit terminating at one end into a funnel and terminating at another end into a body aperture. The rod is slidably disposed within the body aperture and the body conduit. A cylinder reservoir is bound to the body conduit. A measuring device is rotatably bound around the body conduit in order to dispense a certain quantity of solid or fluid matter through a dispensing conduit and into the body conduit. A method for dispensing matter in the ground comprising rotating a filled measuring device until it registers with a lower plate aperture spacedly positioned from the bottom of a cylinder reservoir in order to flow matter from the measuring device through the lower plate aperture, and through a dispensing conduit and into a body conduit wherein it is funneled through a funnel into the ground.

15 Claims, 5 Drawing Sheets

APPARATUS AND IMPROVED METHOD FOR DISPENSING MATTER INTO THE GROUND

This is a continuation-in-part application of my co-pending application filed on May 12, 1986 and having Ser. No. 861,840 now U.S. Pat. No. 4,760,805.

BACKGROUND OF THE INVENTION

1. Field of the Invention

This application is related to an improved apparatus for dispensing liquid or solid matter into the ground. More specifically, this invention provides an improved apparatus and improved method for dispensing liquid or solid matter into a hole in the ground.

2. Description of the Prior Art

U.S. Pat. No. 2,370,744 to Molinare is directed to a fertilizer applicator that penetrates the ground, and then a valve may be opened to allow the discharge of a quantity of fertilizer below the surface of the ground.

U.S. Pat. No. 3,504,647 to Krarup also illustrates a fertilizer applicator wherein same penetrates the ground to allow the quantity of fertilizer to be discharged below the ground surface. U.S. Pat. No. 2,005,598 by Smith further discloses a means for introducing fertilizer below ground level by penetrating the surface of ground with the pointed end thereof, and then operating a valve to allow discharge of the material into the soil.

U.S. Pat. No. 2,065,678 to Fish Jr. teaches a fertilizer to penetrate the ground and may have a valve operated to discharge fertilizer into the hole. None of the foregoing patents teach or suggest the particular improved apparatus and improved method of this invention.

SUMMARY OF THE INVENTION

The present invention accomplishes its desired objects by broadly providing an improved apparatus for dispensing matter into the ground. The improved apparatus comprises a rod means, and a body conduit means terminating at one end into a funnel and terminating at another end into a body aperture. The rod means slidably passes through the body aperture and into the body conduit and the body conduit has a structure defining a body opening. A cylinder reservoir means is coaxially with and bound to the body conduit means. The cylinder reservoir means includes a cylinder bottom having a structure defining a cylinder bottom aperture. A lower plate means is bound to the body conduit means and is spacedly postured with respect to the cylinder bottom and has a structure defining a lower plate aperture. A dispensing conduit means interconnects the lower plate aperture with the body opening to conduct and channel matter from the lower plate aperture and into body conduit through the body opening. The improved apparatus for dispensing matter finally comprises a means for measuring and holding a certain quantity of the matter from the cylinder reservoir means. The means for measuring and holding is rotatably positioned around the body conduit between the cylinder bottom and the lower plate means to dispense the certain quantity matter through the lower plate aperture and into the dispensing conduit means when rotated over the lower plate aperture.

The present invention also accomplishes the desired objects by broadly providing an improved process for dispensing matter into the ground comprising the steps of:

(a) introducing a matter to be dispensed into the cylinder reservoir means;

(b) implanting into the ground the rod means through the funnel of the conduit in order to form a hole in the ground;

(c) removing the rod means from within the ground where a hole has been formed;

(d) rotating a measuring device between the cylinder bottom and the lower plate means until the measuring device registers with the cylinder bottom aperture of the cylinder reservoir means in order for the matter to flow from the cylinder reservoir means through the cylinder bottom aperture into the measuring device to fill the same while the measuring device seals-off the lower plate aperture; and (f) rotating the filled measuring device until it registers with the lower plate aperture in order to flow matter from the measuring device through the lower plate aperture and through the body opening and into the body conduit where it is funneled into the ground.

Therefore, it is the object of the present invention to provide an improved apparatus for dispensing a liquid or a solid matter into the ground.

It is another object of the present invention to provide an improved method for the dispensing of liquid or solid matter underneath the ground.

These, together with the various ancillary objects and features which will become apparent to those skilled in the art as the following description proceeds, are attained by this improved process, preferred embodiment being shown with reference to the accompanying drawings, by way of example only, wherein;

BRIEF DESCRIPTION OF THE DRAWINGS

FIG. 11 is an exploded segmented perspective view of the cylinder reservoir including the measuring device;

FIG. 12 is a partial vertical view of the top of the sleeve having a recess wherein a notch of the collar is positioned for lateral movement;

FIG. 13 is a vertical sectional view taken in direction of the arrows and along the plane of line 13—13 in FIG.

2 and discloses the measuring device open at bottom in order that the matter may flow out into the discharge conduit which conduct the matter into the body conduit;

FIG. 14 is a horizontal sectional view taken in direction of the arrows and along the plane of line 14—14 in FIG. 13;

DETAILED DESCRIPTION OF THE INVENTION

Referring in detail now to the drawings wherein similar parts of the invention are represented by like reference numerals, there is seen the dispensing apparatus for this invention, generally illustrated as 10, for dispensing into the ground a matter, which may be particulate matter (e.g. powders, granules, etc.) or a liquid (e.g. liquid fungicides, insecticides, fertilizer etc.). The apparatus 10 has a body conduit 12 that is hollow throughout its entire length and terminates at one end into a funnel 14 and is formed at another end with a handle 16 with a swinging stop member 18.

The body conduit 12 also terminates into a body aperture 20 which also extends through the handle 16. A longitudinal opening or slot 22 is formed in the side of the body conduit 12 in proximity to where the handle 16 is formed with the end of the body conduit 12 such that the stop member 18 is capable of swinging through the slot 22 towards the center of the body conduit 12. The body conduit 12 also has an opening 23 (See FIG. 13) in the lower part thereof. A collar 24 is bound around the upper part of the body conduit 12 and is structured with a notch (See FIG. 12).

Figures 1, 2, 3, 4, 5, 6, 7:
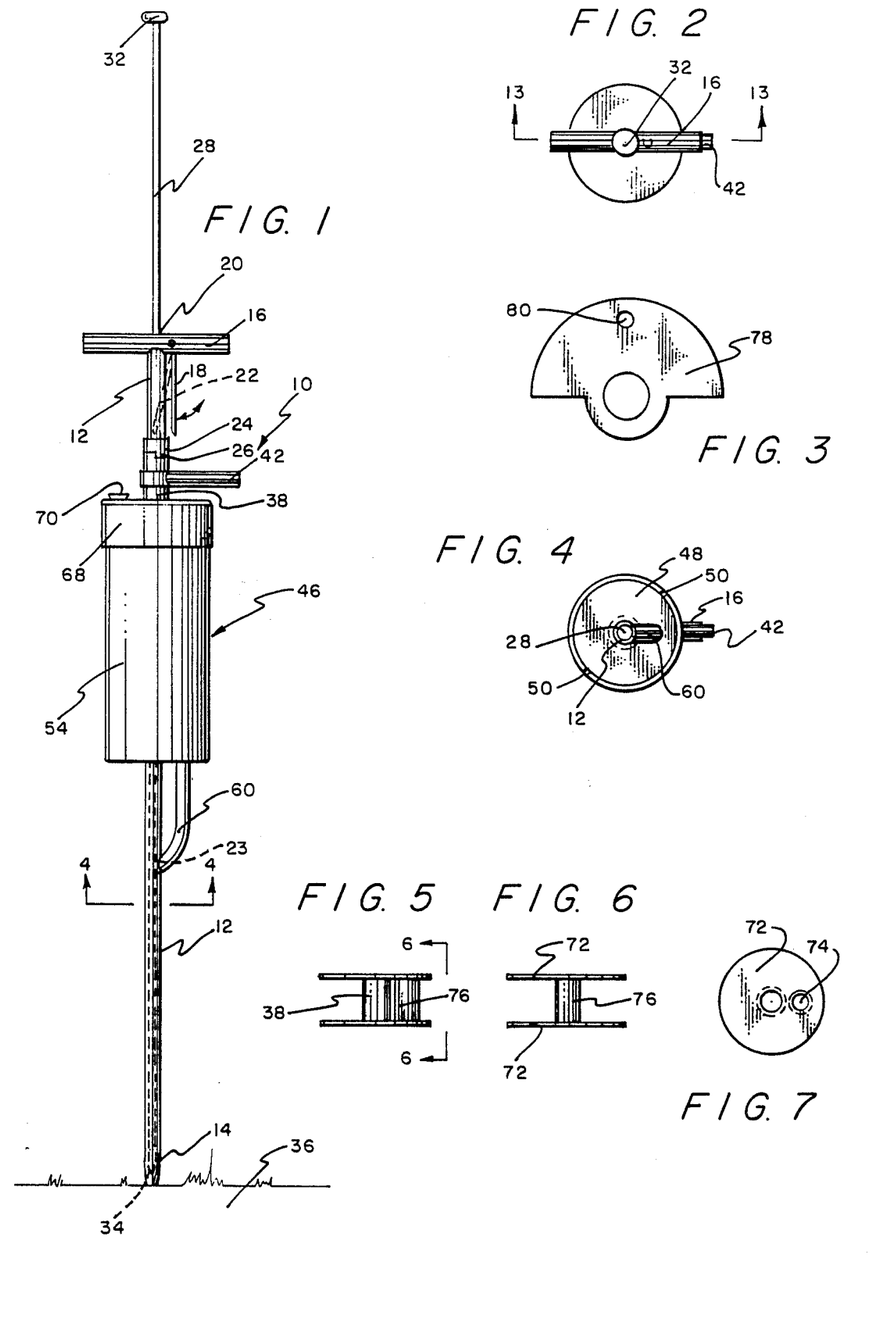
FIG. 1 is a front elevational view of the apparatus for dispensing matter underneath the ground.
FIG. 2 is a top plan view of the apparatus of FIG. 1.
FIG. 3 is a top plan view of a sealing plate that is included in the measuring device.
FIG. 4 is a horizontal sectional view taken in direction of the arrows along the plane of line 4—4 in FIG. 1.
FIG. 5 is a side elevational view of the measuring device of this invention with the support walls of the measuring device removed.
FIG. 6 is a vertical elevational view taken in direction of the arrows along the plane of line 6—6 in FIG. 5.
FIG. 7 is a top plan view of the measuring device of FIG. 5.
Figures 8, 9:
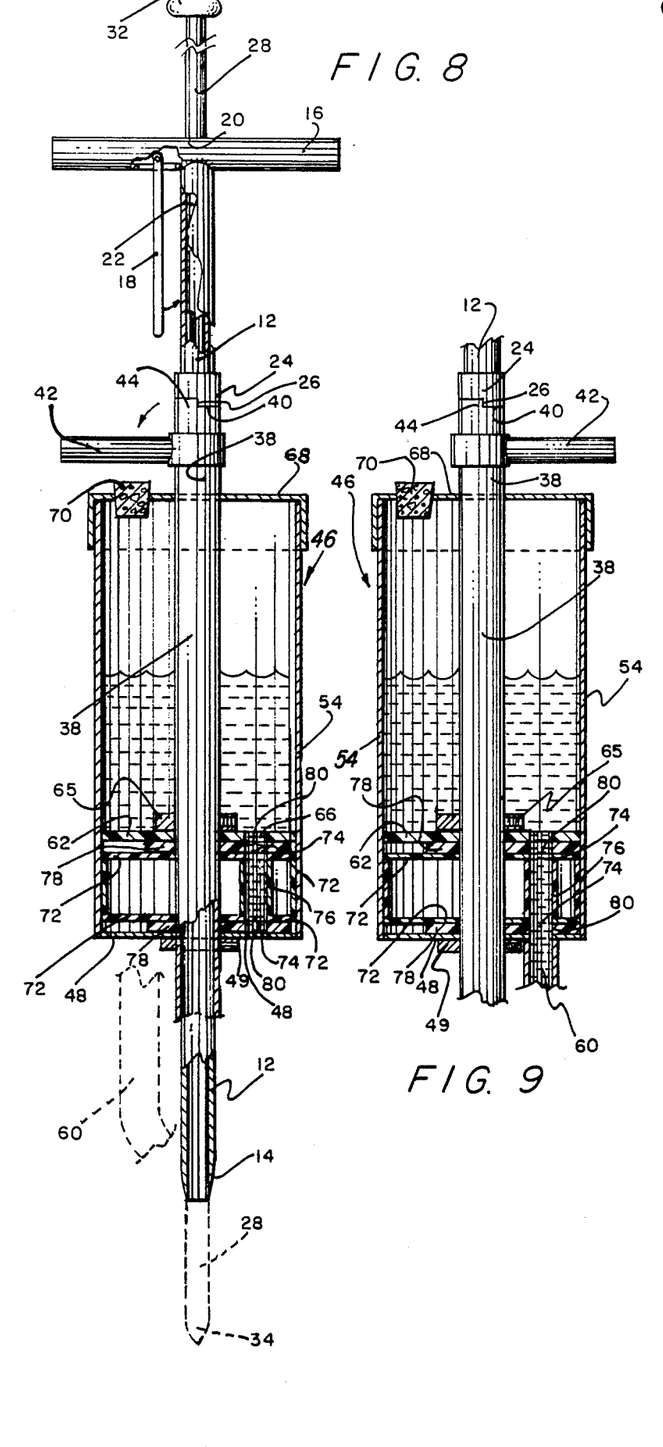
FIG. 8 is an enlarged partial vertical sectional view of the apparatus of this invention disclosing the measuring device positioned for receiving matter from the reservoir of matter within the cylinder.
FIG. 9 is a partial vertical sectional view disclosing the measuring device having captured therein matter after the measuring device has been rotated towards the clockwise position which closes off the top of the measuring device from the reservoir of matter within the cylinder.
Figure 10:
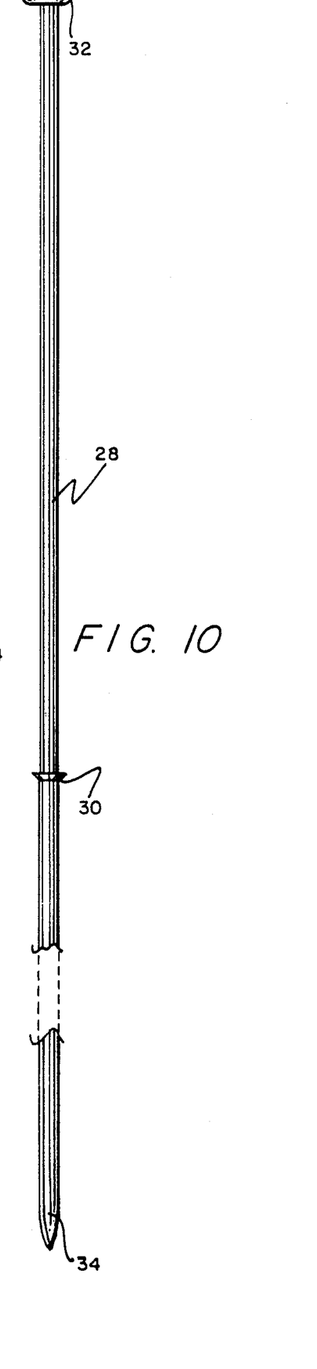
FIG. 10 is a front elevational view of the rod.
Figures 11, 12, 13, 14:
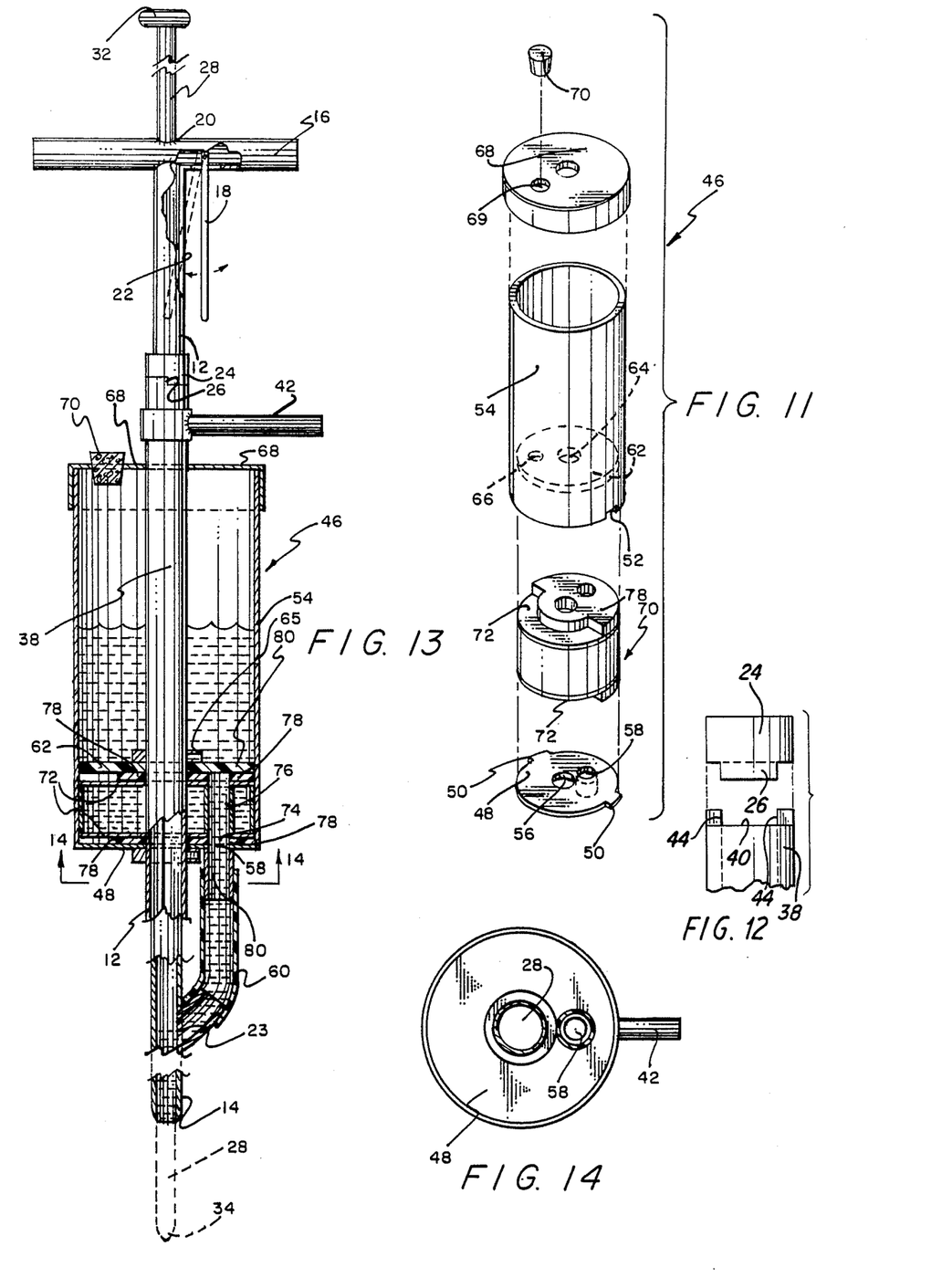
Figure 15:
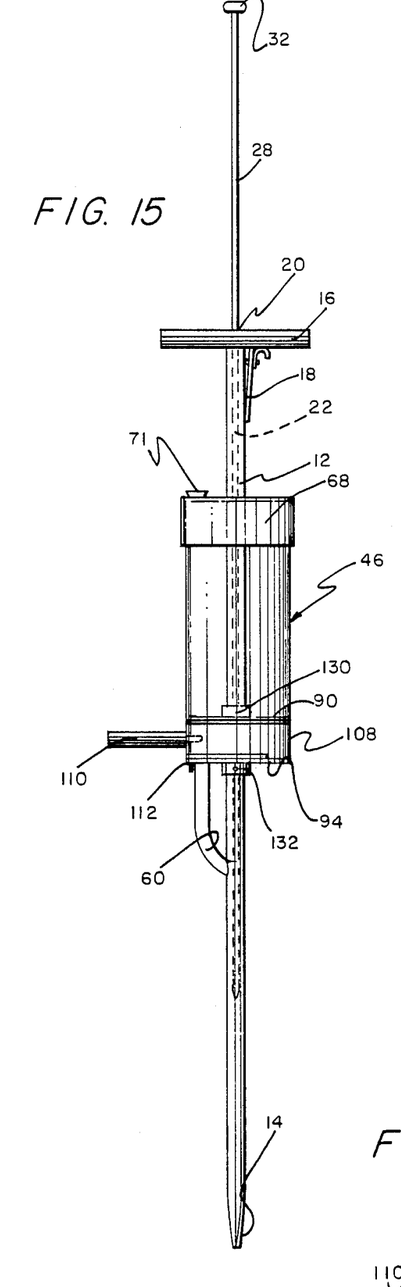
FIG. 15 is a front elevational view of another embodiment of the apparatus of this invention.

A rod 28 is slidably disposed through the aperture 20 and into the body conduit 12 as illustrated in FIGS. 1, 8 and 13. Rod 28 is formed with a rod collar 30 (See FIG. 10) whereupon the end of the swinging stop member 18 may sit to prevent the body conduit 12 from sliding all the way down the rod 28. A rod handle 32 is integrally bound at the upper end of the rod 28, and the lower end of the rod 28 is manufactured with a pointed end 34 that is capable of making a hole in the ground 36 when the rod 28 is driven down through the body conduit 12 with force. When swinging stop member 18 sits on rod collar 30, the pointed end 34 generally seals-off the open end of funnel 14 (see FIG. 1) and forms funnel 14 and pointed end 34 together generally integrally to prevent dirt or other foreign matter from entering the funnel 14. This feature enables a hole to be formed in the ground 36 without dirtying or obstructing the opening of the funnel 14, and also enables the apparatus 10 to be transported by dragging the end of body conduit 12 (i.e. the funnel 14) along the ground 36 without dirtying or contaminating the opening of the funnel 14.

A sleeve 38 is coaxially and rotatably disposed around the body conduit 12 and the upper part of the sleeve 38 has a sleeve recess 40 (see FIG. 12) which has a predetermined length that is somewhat longer than notch 26 is wide. The sleeve 38 is mounted around the body conduit 12 such that the notch 26 resides and protrudes into the sleeve recess 40. A sleeve handle 42 is bound to the sleeve 38 for turning the same. Recess 40 has a pair of recess walls 44—44 that dictate the bounds that the sleeve 38 may be rotated by the handle 42 as notch 26 of collar 24 abuts and encounters a recess wall 44 and prevents the sleeve 38 from being rotated any further.

A cylinder reservoir means, generally illustrated as 46, is coaxial with and is bound to the body conduit 12 through a lower plate 48 that is rigidly affixed to the body conduit 12 and forms the bottom of the cylinder reservoir means 46. A bearing 49 is secured to the body conduit 12 and is flushed against the lower plate 48. Lower plate 48 has a pair of lugs 50—50 (See FIG. 11) that mate with a pair of recesses 52—52 in the lower perimeter of a cylinder conduit 54 which is included within the cylinder reservoir means 46. Cylinder conduit 54 can not rotate because of being engaged to the lower plate 48 through the lugs 50—50 of lower plate 48 seating into the recesses 52—52 of the cylinder conduit 54. The lower plate 48 has an opening 56 wherethrough the body conduit 12 passes, and an aperture 58 where matter leaves the cylinder reservoir means 46 to be conducted or channeled by a dispensing conduit 60 to and through the body opening 23 wherein the matter enters into the ground 36 through the funnel 14 of the body conduit 12 after the rod 28 has made a hole in the ground 36. The dispensing conduit 60 interconnects the aperture 58 of the lower plate 48 with the body opening 23 of the body conduit such that aperture 58 and body opening 23 are in communication with each other.

The cylinder reservoir means 46 also includes an upper plate 62 that is integrally bound to the walls of the cylinder conduit 54. Upper plate 62 supports any matter that is placed into the cylinder conduit 54 and has an opening 64 wherethrough the sleeve 38 rotatably passes. A bearing 65 is bound to the sleeve 38 and is rotatable upon the surface of the upper plate 62 and assist in keeping the sleeve 38 abutting against the collar 24. The upper plate 62 also includes an aperture 66 wherethrough any matter may leave the upper confines of the cylinder conduit 54. The aperture 66 of the upper plate 62 and aperture 58 of the lower plate are not coaxial with respect of each other and do not register in a vertical plane, as illustrated in FIG. 11. The cylinder reservoir means 46 further includes a top 68 that is bound to the upper perimeter of the cylinder conduit 54. Top 68 has an aperture 69 that is removably plugged by a stopper or plug 71.

The sleeve 38 rotatably passes through the top 68, through the aperture 64 of the upper plate 62 and terminates into a lower end that rotatably rest, or is in rotatably proximity to, the lower plate 48. Between the upper plate 62 and the lower plate 48 is a measuring device, generally illustrated as 70, that is bound to the sleeve 38. Measuring device 70 may be any means for measuring and holding a certain quantity of matter from the confines of the cylinder conduit 54 above the upper plate 62 after the matter passes through the aperture 66 of the upper plate 62. When the sleeve 38 is rotated between upper plate 62 and the lower plate 48, the measuring device 70 rotates therewith. In a preferred embodiment of the invention, the measuring device comprises as pair of parallel bearing plates 72—72 bound to the sleeve 38. Each plate 72 has an aperture 74. A measuring conduit 76 generally coaxially interconnects apertures 74—74 of the respective bearing plates 72—72 such that the apertures 74—74 communicate with each other through the measuring conduit 76.

The measuring device 70 additionally comprises a pair of sealing plates 78—78 (see FIG. 3) which are generally semi-circular and are preferably manufactured of a sealing and absorbent material, such as styrofoam, or the like, or any gasket material. Each sealing plate 78 has a seal plate aperture 80. The sealing plates 78—78 are bound to the sleeve 38 and rotate therewith. One of the sealing plates 78 is sandwiched between the upper plate 62 and the uppermost bearing plate 72 with its respective seal plate aperture 80 concentrically positioned over the aperture 74 of the uppermost bearing plate 72. The second or other sealing plate 78 is sandwiched between the lower plate 48 and the lowermost bearing plate 72 with its respective seal plate aperture 80 concentrically positioned under the aperture 74 of the lowermost bearing plate 72. When the measuring device 70 rotates in response to an urge of force on the handle 42 all seal plate apertures 80—80 and all apertures 72—72 remain concentric with respect to each other and with the axis of the measuring conduit 76.

Referring in detail now to FIGS. 15-21 for an improved embodiment to the dispenser 10 of this invention, sleeve 38 has been removed in order to greatly simplify the dispensing apparatus 10. In this improved embodiment for the dispenser 10, the cylinder reservoir means 46 is coaxial with and is bound to the body conduit 12. More specifically, the cylinder reservoir 46 comprises a cylinder bottom 90 that is rigidly bound to the body conduit 12. The cylinder bottom 90 has an opening 91 wherethrough the body conduit 12 passes, and a cylinder bottom aperture 92 where matter leaves the cylinder reservoir means 46. A lower plate 94 is bound to the body conduit 12 and is spacedly positioned with respect to the cylinder bottom 90. The lower plate 94 has an arcuate recess 95 along a portion of its periphery and an opening 96 where matter leaves to be conducted or channeled by the dispensing conduit 60 to and through the body opening 23 wherein the matter enters into the ground 36 through the funnel 14 of the body conduit 12 after the rod 28 has made a hole in the ground 36. The dispensing conduit 60 interconnects the opening 96 of the lower plate 94 with the body opening 23 of the body conduit 12 such that opening 96 and body opening 23 are in communication with each other.

For this embodiment of the invention, the measuring device 70 is rotatably positioned around the body conduit 12 between the cylinder bottom 90 and the lower plate 94 to dispense a certain quantity of matter through the opening 96 and into the dispensing conduit 60 when rotated over the opening 96. In a preferred embodiment of the invention, the measuring device 70 comprises an upper bearing plate 100 and a lower bearing plate 102, both of which rotate around the body conduit 12. The bearing plates 100 and 102 are generally parallel with respect to each other and are rotatable around the body conduit 12. The upper bearing plate 100 has a bearing aperture 104, and the lower bearing plate 102 has a bearing aperture 106. An upright side wall 108 is attached to the upper bearing plate 100 and the lower bearing plate 102 and is rotatable therewith. A measuring conduit 109 generally coaxially interconnects apertures 104 and 106 of the respective bearing plates 100 and 102 such that apertures 104 and 106 communicate with each other through the measuring conduit 109. A handle 110 is attached to the upright side wall 108 in order to provide a means for the user of the dispenser 10 to rotate the measuring device 70 about the body conduit 12.

A protruding bar 112 connects the upright side wall 108 and protrudes below the lower bearing plate 102 as well as below the lower plate 94 within the arcuate bearing recess 95. As will be discussed below, the protruding bar 112 controls the amount of rotation of the bearing plates 100 and 102 to coaxially align the measuring conduit 109 with any apertures or openings.

The measuring device 70 for this embodiment of the invention additionally comprises an upper sealing plate 114 and a lower sealing plate 116 which are generally circular and are preferably manufactured of a sealing and absorbent material, such as styrofoam, or the like, or any gasket material. Sealing plate 114 has a sealing plate aperture 118. Lower sealing plate 116 has a sealing plate aperture 120 and a seal recess 122 along a portion of the perimeter thereof (see FIG. 21). The sealing plates 114 and 116 are bound to the body conduit 12 and rotate with bearing plates 100 and 102. The upper sealing plate 114 is sandwiched between the upper bearing plate 100 and the cylinder bottom 90 with its respective seal plate aperture 118 concentrically positioned under the cylinder bottom aperture 92 of the cylinder bottom 90 and over the bearing aperture 104 of the upper bearing plate 100. The lower sealing plate 116 is sandwiched between the lower bearing plate 102 and the lower plate 94 with its respective seal plate aperture 120 concentrically positioned under the bearing aperture 106 of the lower bearing plate 102 and over the opening 96 of the lower plate 94. When the measuring device 70 rotates in response to an urge of force on the handle 110, the upper seal plate aperture 118 remains concentric with the bearing aperture 104 and the lower seal plate aperture 120 remains concentric with the bearing aperture 106 of the bearing plate 102. As indicated, the upper bearing plate 100, the upper sealing plate 114, the lower sealing plate 116, and the lower bearing plate 102 (including the associated measuring conduit 109 that communicates bearing aperture 104 with bearing aperture 106) move in response to force on handle 110. The protruding bar 112 extends and protrudes below the lower seal plate 116 and the lower plate 94 within the respective arcuate seal recess 122 and arcuate bearing recess 95 and serves as an estoppel means to guide the extremity of the rotation of the bearing plates 100 and 102 to align the axis of the measuring conduit 109 with either the cylinder bottom aperture 92 or the opening 96. When the bar 112 encounters the extremities of the plate recess 95, the bearing plates 100 and 102 can not be rotated any further by the handle 110. An upper bushing 130 is rigidly affixed to the body conduit 12 and snugly lodges against the cylinder bottom 90. A lower bushing 132 is also rigidly affixed to the body conduit 12 and supports the lower plate 94. Bushings 130 and 132 sandwich in the cylinder bottom 90, the upper seal plate 114, the bearing plates 100 and 102 and the associated moving conduit 109, the lower seal plate 116, and the lower plate 94 such that the seal plates 114 and 116 make a tight fit between any contacting elements to keep dispensing matter from leaking out.

With continuing reference to the drawings for operation of the invention and the process for dispensing matter into the ground 36 for the embodiment of the apparatus depicted in FIGS. 1-14, plug 71 is removed from the top 68 of cylinder conduit 54 and desired matter (e.g. solid or liquid materials or the like) to be dispensed is introduced into the cylinder conduit 54. At this point, or before the introduction of the matter to be dispensed the stop member 18 is preferably swung through the slot 22 towards the center of the body conduit 12, and the body conduit (including the cylinder reservoir means 46) is slid down the rod 28 until the stop member 18 encounters and is jammed on the rod collar 30 in order for the same to support the body conduit 12. Also at this point in time, handle 42 may or may not be already rotated all the way counter-clockwise until the notch 26 of collar 24 abuts a recess wall 44 of recess 40 of the sleeve 38.

FIG. 8 is representative of the position where the handle 42 has been rotated all the way counter-clockwise. With the handle 42 in this position, matter from the confines of the cylinder conduit 54 immediately enters the measuring conduit 76 through the aperture 66 (of the upper plate 62), through seal plate aperture 80, and through the aperture 74 of the uppermost bearing plate 72. The opening 58 of the lower plate 48 is not concentric or aligned with the axis of the measuring conduit 76 or with the centers of aperture 74 (of lowermost bearing plate 72) or seal plate aperture 80 (of the lowermost sealing plate 78) and therefore a structural part of the lower plate 48 (as represented in FIG. 8) seals-off the seal plate aperture 80 of the lowermost sealing plate 78 so that the matter is retained within the measuring device 70 including the measuring conduit 76.

With matter within the measuring conduit 76, it may be captured and held by merely rotating the handle 42 clockwise. FIG. 9 is representative of the position where the measuring device 70 has captured and retained a predetermined quantity of matter. In this position a structural part of the lower plate 48 is sealing-off the seal plate aperture 80 of the lowermost sealing plate 78, simultaneously with a structural part of the upper plate 62 sealing-off the seal plate aperture 80 of the uppermost sealing plate 78 as this seal plate aperture, as well as the measuring conduit 76 and apertures 74—74 of the bearing plates 72—72 and the seal plate aperture 80 of the lowermost sealing plate 78, have all been rotated away from opening 66 in the upper plate 62.

The matter is remained captured and held as long as the handle 42 is not rotated all the way clockwise whereupon notch 26 of the collar 24 would abut and contact the recess wall 44 opposed to the recess wall 44 that it abuts and contacts when the handle 42 is in a furthermost counter-clockwise position. FIG. 13 is representative of the position with handle 42 rotated all the way clockwise. In this position, the measuring device 70 (including the measuring conduit 76) is rotated over the aperture 58 of the lower plate 48 and a predetermined, generally precise quantity of captured and held matter may now flow out of the measuring conduit 76 of the measuring device 70, into the dispensing conduit 60, and through opening 23 of the body conduit 12 for eventual discharge through the funnel 14 and into a hole in the ground 36. Obviously, this procedure is not conducted until a hole has been placed in the ground 36 in order for the matter to be funneled into the ground.

In order to place a hole into the ground 36, the point 34 of the rod 28 is driven through the funnel 14 of the body conduit 12 and into the ground 36. To accomplish this, force or weight may be exerted by the user on the handle 32, and during the exertion the body conduit 12 (including the cylinder reservoir means 46) may be resting on the rod collar 30 through the use of the stop member 18. Alternatively, the body conduit 12 may be held in one hand through the use of the handle 16, while the other hand places force on the handle 32 of the rod 28. The rod 28 is subsequently removed from within the ground by preferably holding handle 16 with one hand and pulling up on handle 32 with the other hand. This releases the stop member 18 which swings out of slot 22 and away from the body conduit 12. Subsequently, the funnel 14 is positioned over the formed hole. The dispensing apparatus 10 is now in position (See FIG. 1) for dispensing the matter, with the proper positioning and actuation of the measuring device 70.

If the measuring device 70 has not already captured and is holding a generally precise quantity of matter, the handle 42 is rotated to the furthermost counterclockwise position of FIG. 8 in order to fill the measuring device 70 in accordance with the previously mentioned procedure. After the measuring device 70 has been filled, the handle 42 is rotated towards the clockwise direction to capture the matter, as illustrated in FIG. 9 and previously explained. In order to dispense the captured matter through the funnel 14 and into the hole previously formed in the ground 36, the handle 42 is rotated all the way to the furthermost clockwise position, as illustrated in FIG. 13. In this position as has been previously explained, the matter flows out of the measuring device 70, through dispensing conduit 60 and opening 23 and into the lower part of the body conduit 12 for dispensing by gravity the matter through the funnel 14 and into the ground 36. Preferably, the rod 28 has been raised inside of the body conduit 12 above the opening such that flow of matter through the opening 23 and the lower internals of the body conduit 12 is not obstructed after the generally precise amount of matter has been dispensed into the hole the ground. The entire procedure may be repeated elsewhere in the ground 36. Thus, by the practice of this invention, a predetermined amount of matter may be dispensed into the ground 36 without the concern of dispensing too much matter or not enough matter.

With continuing reference now to the drawings for operation of the dispensing apparatus 10 of FIGS. 15-21, including the process for dispensing matter into the ground 36 for the embodiment of the apparatus 10 depicted in FIGS. 15-21, plug 71 is removed from the top 68 of the cylinder reservoir means 46 and predetermined desired matter (e.g. solid or liquid materials or the like) to be dispensed through the funnel 14 is introduced into the cylinder reservoir 46. Similar to the operation of the dispensing apparatus 10 of FIGS. 1-14, at this point in time, or before the introduction of the matter to be dispensed, the stop member 18 is preferably swung through the slot 22 towards the center of the body conduit 12, and the body conduit 12 (including the cylinder reservoir means 46) is slid down the rod 28 until the stop member 18 encounters and is supported on the rod collar 30. In such a position, the stop member 18 supports and prevents the body conduit 12 from sliding all the way down to the pointed end 34 of the rod 28.

Also at this point in time, handle 110 may or may not be already rotated all the way clockwise until the protruding bar 112 abuts or engages an end extremity of the lower plate recess 95.

Figure 16:
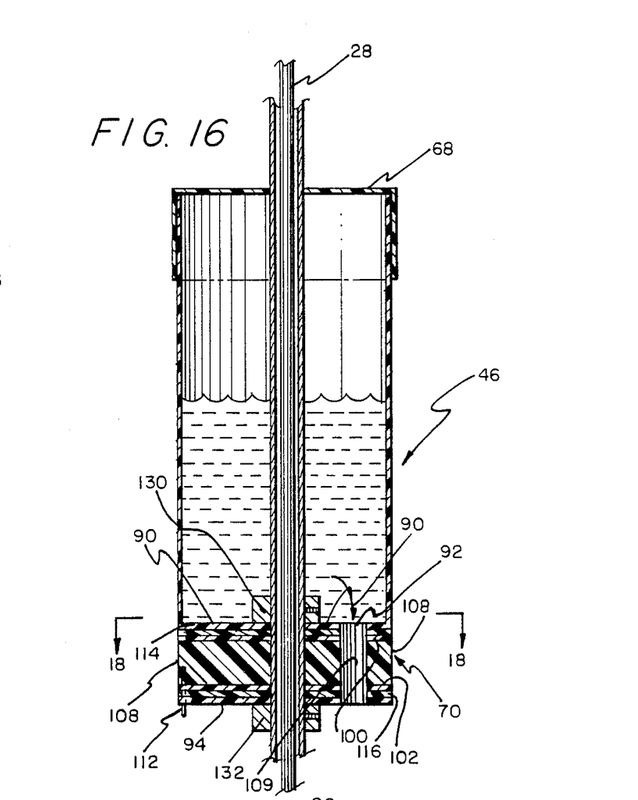
FIG. 16 is a vertical sectional view taken in direction of the arrows and along the plane of line 16—16 in FIG. 17.
Figure 17:
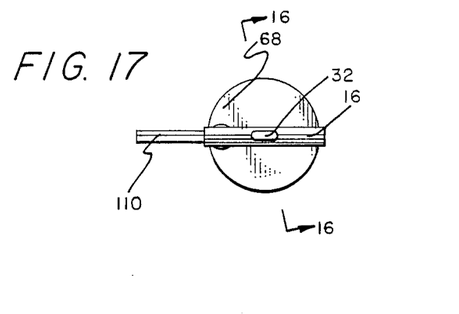
FIG. 17 is a top plan view of the apparatus having the embodiment of FIG. 15.
Figure 18:
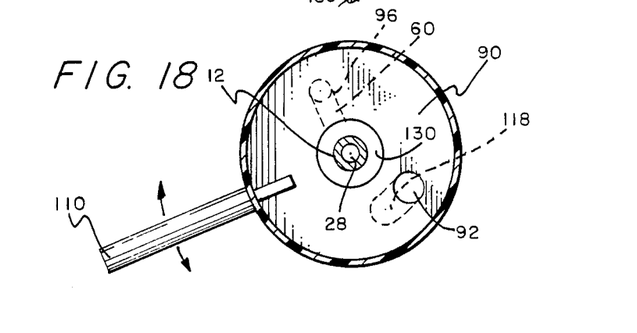
FIG. 18 is a horizontal sectional view taken in direction of the arrows and along the plane of line 18—18 in FIG. 16.

FIG. 16 is the representative position where the handle 110 has been rotated all the way clockwise. With the handle 110 in this position, matter from the internals of the cylinder reservoir 46 immediately enters the measuring conduit 109 through the cylinder bottom aperture 92, through the upper seal aperture 118, and through the aperture 104 of the upper bearing plate 100. The opening 96 of the lower plate 94 is not concentric or aligned with the axis of the measuring conduit 109 or with the center of the aperture 106 (of lowermost bearing plate 102) or with the center of lower seal aperture 120 (of lower seal plate 116); and therefor a structural part of the lower plate 94 (as represented in FIG. 16) seals-off the aperture 106 of the lower seal plate 102 and lower seal aperture 120 so that the matter is retained within the measuring device 70 which includes the measuring conduit 109.

As was seen for the embodiment of the dispensing apparatus 10 of FIGS. 1-14, matter within the measuring conduit 109 may be captured and held by merely rotating the handle 110 counterclockwise. As was seen for the dispensing apparatus 10 in FIG. 9, in this position a structural part of the lower plate 94 is in this position a structural part of the lower plate 94 is sealing-off the lower seal aperture 120 of the lower seal plate 116 and the aperture 106 of the lower bearing plate 102, simultaneously with a structural part of the cylinder bottom 90 sealing-off the upper seal aperture 118 of the upper seal plate 114 and the aperture 104 of the upper bearing plate 100, as well as the measuring conduit 109.

Figures 19, 20, 21:
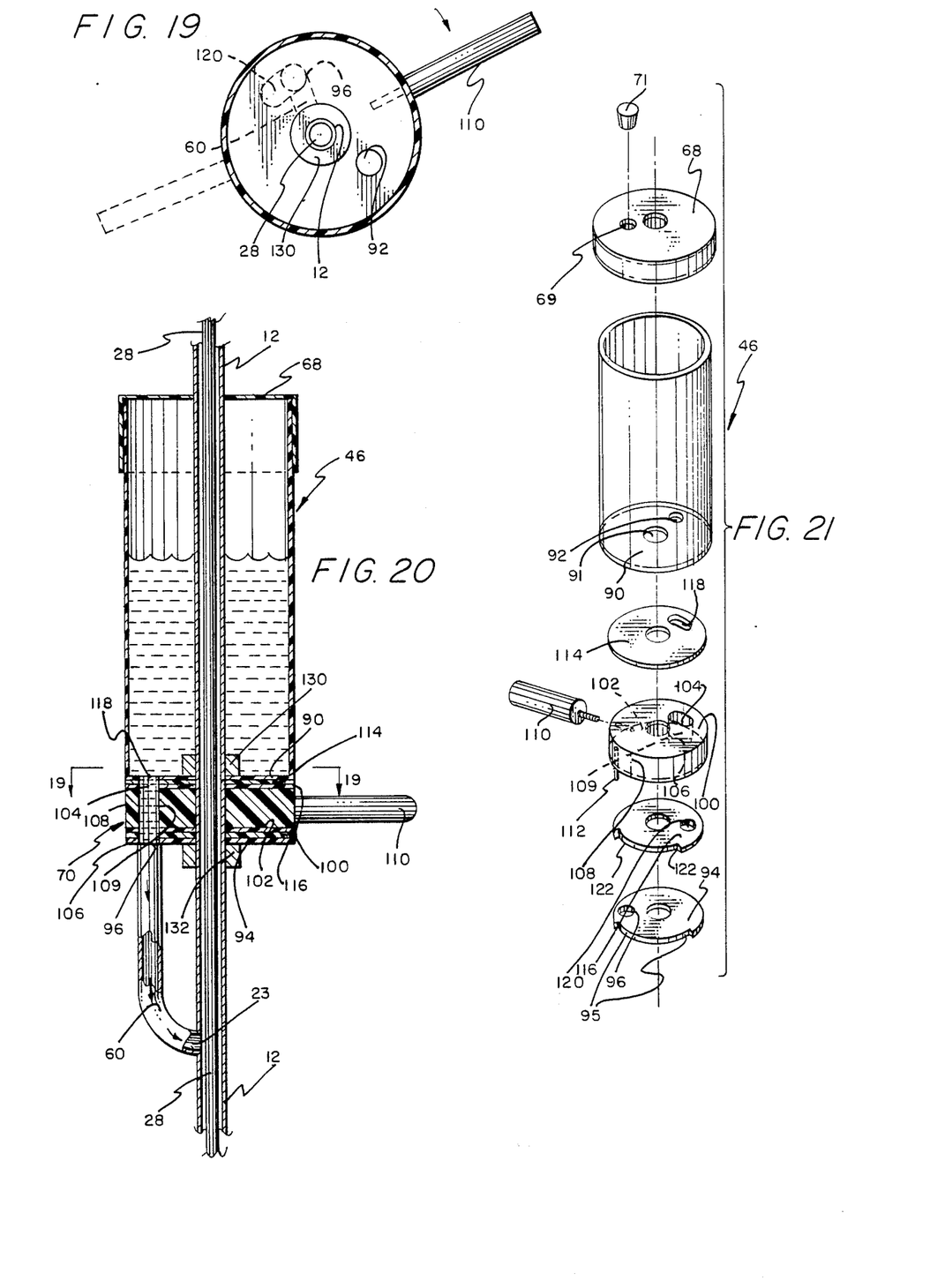
FIG. 19 is a horizontal sectional view taken in direction of the arrows and along the plane of line 19—19 in FIG. 20.
FIG. 20 is a vertical sectional view of the apparatus having the embodiment of FIG. 15 in the dispensing position.
FIG. 21 is an exploded segmented perspective view of the cylinder reservoir and measuring device of the apparatus of FIG. 15.

The matter is remained captured and held as long as the handle 110 is not rotated all the way counter-clockwise whereupon the protruding bar 112 abuts and contacts an extreme end of the recess 95. FIG. 20 is representative of the position when handle 110 is rotated all the way to a counter-clockwise position. In this position, the measuring device 70 (including the measuring conduit 76) is rotated over the opening 96 of the lower plate 94 and a predetermined, generally precise quantity of captured and held matter may now flow out of the measuring conduit 109 of the measuring device 70, into the dispensing conduit 60, and through opening 23 of the body conduit 12 for eventual discharge through the funnel 14 and into a hole in the ground 36. As has been previously seen, this procedure is not conducted until a hole has been placed in the ground 36 in order that the matter can be funneled into the ground. In order to place a hole into the ground, the point 34 of the rod 28 is driven through the funnel 14 of the body conduit 12 as has been previously mentioned. The procedure to place a hole in the ground 36 with the point 34 of the rod 28 for the embodiment of the apparatus 10 of FIGS. 15-21, is identical to the procedure that has been previously mentioned for the embodiment of the dispensing apparatus for FIGS. 1-14.

If the measuring device for the embodiment of the invention in FIGS. 15-21 has not already captured and is holding a generally precise quantity of matter, the handle 110 is rotated to the furthermost clockwise position of FIG. 16 in order to fill the measuring device 70 in accordance with the previously mentioned procedure. After the measuring device 70 including its measuring conduit 109 has been filled, the handle 110 is rotated towards the counter-clockwise direction to capture the matter, similarly to what is illustrated in FIG. 9 and as was previously explained. In order to dispense the captured matter through the funnel 14 and into the hole previously formed in the ground 36, the handle 110 is rotated all the way to the furthermost counter-clockwise position, as illustrated in FIG. 20. In this position and as has been previously explained, the matter flows out of the measuring device 70 (more specifically, the measuring conduit 109), through the dispensing conduit 60 and the opening 23, and into the lower part of the body conduit 12 for further dispensing by gravity through funnel 14 and eventually into the ground 36. Preferably, the rod 28 has been elevated inside of the body conduit 12 above the opening 23 such that flow of matter through opening 23 and the lower internals of the body conduit 12 is not obstructed after the essential precise amount of matter has been dispensed into the hole in the ground 36. The foregoing entire procedure for the embodiment of the dispensing apparatus 10 that is depicted in FIGS. 15-21, may be repeated for other holes in the ground 36. Thus, by the practice of the invention for the preferred apparatus 10 in FIGS. 15-21, a less complicated and more simplified means is provided to dispense a predetermined amount of matter into the ground 36 without the concern of dispensing too much matter or not enough matter.

While the present invention has been described herein with reference to particular embodiments thereof, a latitude of modifications, various changes and substitutions are intended in the foregoing disclosure, and it will be appreciated that in some instances some features of the invention will be employed without a corresponding use of other features without departing from the scope of this invention as set forth.

I claim:

1. An apparatus for dispensing matter into the ground comprising:

a rod means;

a body conduit means terminating at one end into a funnel and terminating at another end into a body aperture, said rod means slidably passes through said body aperture and into said body conduit, and said body conduit having a structure defining a body opening;

a cylinder reservoir means coaxial with and bound to said body conduit means, said cylinder reservoir means including a cylinder bottom having a structure defining a cylinder bottom aperture; and a lower plate means bound to said body conduit means and spacedly positioned with respect to said cylinder bottom and having a structure defining a lower plate aperture;

a dispensing conduit means interconnecting said lower plate aperture with said body opening to conduct and channel matter from said lower plate aperture and into said body conduit through said body opening;

a means for measuring and holding a certain quantity of matter from said cylinder reservoir means and rotatably positioned around said body conduit means between said cylinder bottom and said lower plate means to dispense the certain quantity of matter through said lower plate aperture and into said dispensing conduit means when rotated over the lower plate aperture; and said means for measuring and holding a certain quantity of matter comprises an upper bearing plate and a lower bearing plate, said bearing plates are generally parallel with respect to each other and are rotatable around said body conduit means; each bearing plate has a structure defining a bearing aperture; an upright side wall attached to said upper bearing plate and said lower bearing plate and is rotatable therewith; and handle means attached to said upright side wall in order to rotate the upper bearing plate and lower bearing plate about the body conduit means.

2. The apparatus of claim 1 wherein said body opening is situated between the body aperture and the funnel, and said body conduit means extends above said cylinder reservoir means.

3. The apparatus of claim 1 wherein said means for measuring and holding a certain quantity of matter additionally comprises a protruding bar means connected to said upright side wall and protruding below the lower bearing plate, and a measuring conduit generally coaxially interconnecting the bearing aperture of the upper bearing plate with the bearing aperture of the lower bearing plate such that the bearing apertures communicate with each other through the measuring conduit.

4. An apparatus for dispensing matter into the ground comprising:
   a rod means;
   a body conduit means terminating at one end into a funnel and terminating at another end into a body aperture, said rod means slidably passes through said body aperture and into said body conduit, and said body conduit having a structure defining a body opening situated between the body aperture and the funnel;
   a cylinder reservoir means coaxial with and bound to said body conduit means with a portion of said body conduit means extending above said cylinder reservoir means, said cylinder reservoir means including a cylinder bottom having a structure defining a cylinder bottom aperture; and a lower plate means bound to said body conduit means and spacedly positioned with respect to said cylinder bottom and having a structure defining a lower plate aperture;
   a dispensing conduit means disposed on the outside of said body conduit means, said dispensing conduit means interconnecting said lower plate aperture with said body opening to conduct and channel matter on the outside of said body conduit means from said lower plate aperture and into said body conduit through said body opening; and
   a means for measuring and holding a certain quantity of matter from said cylinder reservoir means and rotatably positioned around said body conduit means between said cylinder bottom and said lower plate means to dispense the certain quantity of matter through said lower plate aperture and into said dispensing conduit means when rotated over the lower plate aperture.

5. The apparatus of claim 4 additionally comprising a first handle means integrally bound to said end of said body conduit means having said body aperture, and said body aperture extends through said first handle means.

6. The apparatus of claim 5 additionally comprising a swinging stop member pivotally attached to said first handle means.

7. The apparatus of claim 6 wherein said body conduit additionally comprises a longitudinal slot formed in a side wall thereof in proximity to said first handle means such that said swinging stop member may swing through said longitudinal slot towards the center of said body conduit.

8. The apparatus of claim 7 wherein said rod means comprises a collar which is capable of engaging the swinging stop member to support the body conduit and preventing the same from sliding down the rod means.

9. The apparatus of claim 5 wherein said means for measuring and holding a certain quantity of matter comprises an upper bearing plate and a lower bearing plate, said bearing plates are generally parallel with respect to each other and are rotatable around said body conduit means; each bearing plate has a structure defining a bearing aperture; an upright side wall attached to said upper bearing plate and said lower bearing plate and is rotatable therewith; and a second handle means attached to said upright side wall in order to rotate the upper bearing plate and lower bearing plate about the body conduit means.

10. The apparatus of claim 9 wherein said means for measuring and holding a certain quantity of matter additionally comprises a protruding bar means connected to said upright side wall and protruding below the lower bearing plate, and a measuring conduit generally coaxially interconnecting the bearing aperture of the upper bearing plate with the bearing aperture of the lower bearing plate such that the bearing apertures communicate with each other through the measuring conduit.

11. The apparatus of claim 7 wherein said means for measuring and holding a certain quantity of matter additionally comprises a pair of sealing plates, each sealing plate having a seal plate aperture.

12. The apparatus of claim 11 wherein the sealing plates are bound to the body conduit means with one sealing plate being sandwiched between the cylinder bottom and the upper bearing plate with its respective seal plate aperture concentrically positioned under the cylinder bottom aperture of the cylinder bottom, and the other sealing plate being sandwiched between the lower plate means and the lower bearing plate with its respective seal plate aperture concentrically positioned under the bearing aperture of the lower bearing plate.

13. The apparatus of claim 12 wherein said lower plate means has a structure defining an arcuate plate recess along the perimeter thereof and said other sealing plate having a structure defining an arcuate seal plate recess that is aligned with said arcuate plate recess; and said protruding bar means extends through said arcuate plate recess and said arcuate seal plate recess.

14. A process for dispensing matter into the ground comprising the steps of:
   (a) introducing a matter to be dispensed into a cylinder reservoir means that contains a cylinder bottom with a cylinder bottom aperture and wherein said cylinder reservoir means is bound coaxially to a body conduit means that extends above said cylinder reservoir means and terminating at one end into a funnel and terminating at another end into a body aperture and has a body opening situated between the body aperture and the funnel;
   (b) implanting into the ground a rod means through the
   (c) removing the rod means from within the ground where a hole is formed;
   (d) positioning the funnel of the body conduit means over the hole;

(e) rotating a measuring device between the cylinder bottom, and a lower plate means bound to the body conduit means and spacedly positioned with respect to the cylinder bottom and having structure defining a lower plate aperture, said rotating being until the measuring device registers with the cylinder bottom aperture in order for the matter to flow from the cylinder reservoir means through the cylinder bottom aperture and into the measuring device to fill the same while the measuring device seals-off the lower plate aperture;

(f) rotating the filled measuring device of step (e) until it registers with the lower plate aperture in order to flow matter from the measuring device through the lower plate aperture, through a dispensing conduit means interconnecting the lower plate aperture with the body opening and disposed on the outside of said body conduit means, and through the body opening and into the body conduit wherein it is funneled through the funnel and into the ground.

15. The process of claim 14 additionally comprising raising the rod means above the body opening prior to rotating step (f).

* * * * *